United States Patent [19]
Takeshima et al.

[11] Patent Number: 4,745,514
[45] Date of Patent: May 17, 1988

[54] LOAD CURRENT CONTROL DEVICE

[75] Inventors: Sadao Takeshima; Hideo Yabe, both of Higashimatsuyama, Japan

[73] Assignee: Jidosha Kiki Co., Ltd., Tokyo, Japan

[21] Appl. No.: 880,989

[22] Filed: Jul. 2, 1986

[30] Foreign Application Priority Data

Jul. 18, 1985 [JP] Japan ........................... 60-108858[U]

[51] Int. Cl.[4] ..................... H01H 47/00; G05B 11/28; B62D 5/06

[52] U.S. Cl. .................................... 361/154; 318/599; 180/142

[58] Field of Search ....................... 361/152, 153, 154; 180/142; 318/599, 503, 341

[56] References Cited

U.S. PATENT DOCUMENTS 4,454,573 6/1984 Petsch et al. ........................ 318/599
4,624,335 11/1986 Shiraishi et al. .................... 180/142
4,628,885 12/1986 Ogburn et al. ...................... 361/152

*Primary Examiner*—L. T. Hix
*Assistant Examiner*—David Porterfield
*Attorney, Agent, or Firm*—Townsend & Townsend

[57] ABSTRACT

A load current control device operates so as to control the magnitude of a current delivered to a load by varying a duty factor. With this control device, a fundamental value is determined on the basis of an instruction of an input signal, and a reference duty factor and a reference current value are determined on the basis of the fundamental value. The control device further operates to correct the reference duty factor on the basis of a difference between the magnitude of a current actually flowing in the load and the reference current value to turn on and off a power supplied in accordance with the corrected duty factor, therby to control the magnitude of the load current. In addition, when the above-said difference is out of a predetermined range, this load current control device outputs a signal indicative of abnormal condition.

5 Claims, 1 Drawing Sheet

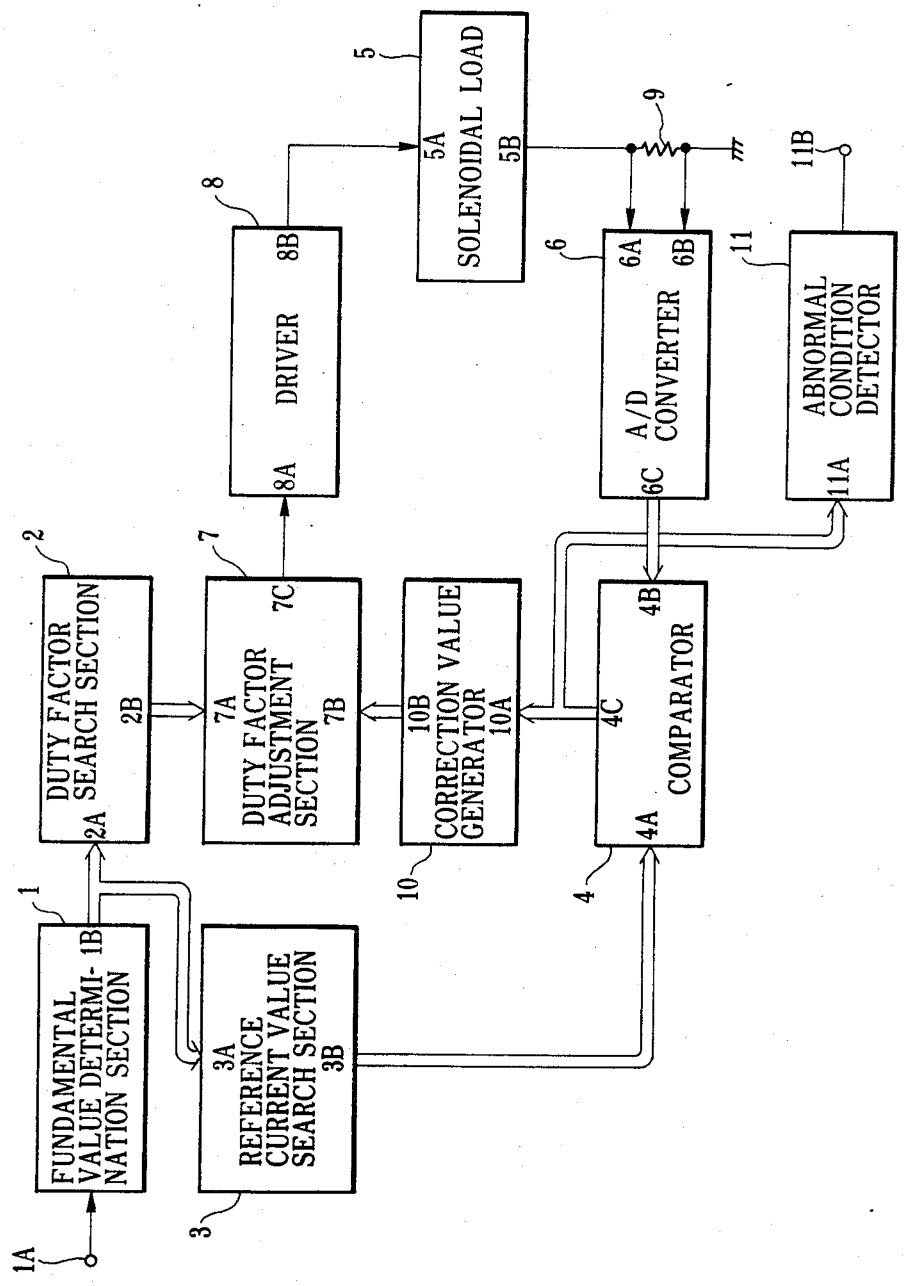
1A
1
FUNDAMENTAL VALUE DETERMI-NATION SECTION
1B
2
2A
DUTY FACTOR SEARCH SECTION
2B
3
3A
REFERENCE CURRENT VALUE SEARCH SECTION
3B
7
7A
DUTY FACTOR ADJUSTMENT SECTION
7B
7C
10
10A
CORRECTION VALUE GENERATOR
10B
4
4A
COMPARATOR
4B
4C
8
8A
DRIVER
8B
5
5A
SOLENOIDAL LOAD
5B
9
6
6A
6B
6C
A/D CONVERTER
11
11A
ABNORMAL CONDITION DETECTOR
11B

LOAD CURRENT CONTROL DEVICE

BACKGROUND OF THE INVENTION

The present invention relates to a load current control device, and more particularly to a load current control device for controlling the magnitude of a current flowing in a solenoidal load.

Power steering systems which can easily effect steering of automobiles by using steering assistance are put into practice. In such steering systems, information related to steering every moment is detected by a detector attached on a steering wheel etc. to change this information into an electric signal to transmit the electric signal to a steering mechanism for actually carrying out steering operation by way of an electric wire. The steering mechanism is operated by an oil pressure system. By controlling an oil flow of the oil pressure system, its output is controlled. The oil flow is controlled by the opening and closing operation of a solenoid valve. The opening and closing operation of the solenoid valve is controlled by the magnitude of a current flowing in a solenoid. The control of the magnitude of a current flowing in the solenoid is effected by turning on and off a power delivered to the solenoid in accordance with a duty factor determined based on the above-mentioned steering information signal.

However, the drawback with the conventional power steering system is that even when the power supplied is turned on and off in accordance with a predetermined duty factor, voltage of the power source varies and the resistance value of the solenoid varies due to changes in temperature based on changes in the condition of the solenoid valve, with the result that the magnitude of a current also varies.

In addition, a detection circuit for detecting breaks or shorts of the solenoid is provided separately from a control circuit for a current flowing in the solenoid.

SUMMARY OF THE INVENTION

An object of the present invention is to provide a load current control device which has eliminated drawbacks with the above-mentioned prior art, and which effects a control such that the magnitude of a load current is kept constant and has a function of detecting abnormal condition.

A load current control device according to the present invention comprises: drive means responsive to a drive control signal indicative of a duty factor to be imposed on a solenoidal load for connecting a power source to the load or disconnecting the power source therefrom according to the imposed duty factor; detector means for detecting the magnitude of the current flowing in the solenoidal load; means responsive to an input signal indicative of an instruction related to the current flowing in the solenoidal load for determining a fundamental value based on the instruction; duty factor search means for outputting a signal indicative of the duty factor corresponding to the fundamental value; means for outputting a signal indicative of a reference current value corresponding to the fundamental value; comparator means for comparing an actual load current value outputted from the detector means with the reference current value to output a signal indicative of a difference therebetween; means for correcting the duty factor ouputted from the duty factor search means by the difference signal outputted from the comparator means to supply the drive control signal indicative of the corrected duty factor to the drive means; and means responsive to an output signal of the comparator means for producing a signal indicative of an abnormal condition when the difference is out of a predetermined range.

BRIEF DESCRIPTION OF DRAWING

The FIGURE is a block diagram illustrating an embodiment of a load current control device according to the present invention.

DETAILED DESCRIPTION OF THE PREFERRED EMBODIMENT

The present invention will be described in detail with reference to the drawing.

The FIGURE is a block diagram illustrating an embodiment of a load current control device according to the present invention. In this FIGURE, a steering information signal obtained by changing steering information related to steering operation applied to a steering wheel of an automobile into an electric signal is input to an input terminal 1A of a fundamental value determination section 1. The fundamental value determination section 1 determines a fundamental value related to a solenoidal load 5 (which will be referred to later) provided in a steering power unit on the basis of the value of the input signal to output a signal indicative of the fundamental value from an output terminal 1B as a digital signal. The output terminal 1B of the fundamental value determination section 1 is connected to an input terminal 2A of a duty factor search section 2 and to an input terminal 3A of a reference current value search section 3. The duty factor search section 2 memorizes therein a corresponding relationship between the fundamental value and a duty factor of the solenoidal load 5 to determine a duty factor corresponding to the fundamental value delivered from the input terminal 2A to output a signal indicative of the duty factor from an output terminal 2B. The reference current value search unit 3 memorizes therein a corresponding relationship between the fundamental value and a reference current value to be delivered to the solenoid as digital values to determine a reference current value corresponding to the fundamental value delivered to its input terminal 3A to output a digital signal indicative of the reference current value from an output terminal 3B. The output terminal 3B of the reference current value search section 3 is connected to one input terminal of a comparator 4. The output terminal 2B of the duty factor search section 2 is connected to one input terminal 7A of a duty factor adjustment section 7.

The duty factor adjustment section 7 outputs, from an output terminal 7C, a signal indicative of a value obtained by adding a value of a signal input to the input terminal 7A to a value (corrected value) of a signal input to the other input terminal 7B or by subtracting the latter from the former. This output terminal 7C is connected to a signal input terminal 8A of a driver 8.

The driver 8 is incorporatedly provided therein with a power source for producing a power supply voltage delivered to the solenoidal load 5. This power source is connected to one terminal 5A of the solenoidal load 5 from an output terminal 8B through a switch (not shown). The switch provided in the driver 8 effects on-off operation in accordance with a duty factor based on a signal delivered to the input terminal 8A. The other terminal 5B of the solenoidal load 5 is grounded through a resistor 9. Both ends of the resistor 9 are connected to input terminals 6A and 6B of an A/D converter 6, respectively. An output terminal 6C of the A/D converter 6 is connected to the other input terminal 4B of the comparator 4. The comparator 4 obtains a difference between input digital signals from the input terminals 4A and 4B to output a signal indicative of the difference from an output terminal 4C. This output terminal 4C is connected to an input terminal 10A of a correction value generator 10 and to an input terminal 11A of an abnormal condition detector 11.

The correction value generator 10 generates a corrected value of a duty factor corresponding to a signal input to the input terminal 10A to output a signal indicative of the corrected value from an output terminal 10B. This output terminal 10B is connected to the other input terminal 7B of the duty factor adjustment section 7.

The abnormal condition detector 11 is constituted with a window comparator. The upper and lower limits of the window are set on the basis of a safety limit value of a current and an operable minimum value of the solenoid 5, respectively. When a voltage applied to the input terminal 11A is out of this window range, the abnormal condition detector 11 outputs a signal indicative of abnormal condition from the output terminal 11B.

The operation of the load current control device thus configured is as follows. The fundamental value detemination section 1 determines a fundamental value corresponding to an input signal delivered thereto to output the reference value. The duty factor search section 2 outputs a duty factor signal indicative of a duty factor corresponding to the fundamental value delivered. The duty factor signal is delivered to the driver 8 through the duty factor adjustment section 7. The driver 8 turns on and off a power delivered to the solenoidal load 5 in accordance with the duty factor signal thus delivered. In the solenoidal load 5, a current flows during on-time period of the driver 8 and is interrupted during off-time period thereof. Accordingly, when the duty factor is large, a current of a large average value flows, while when the duty factor is small, a current of a small average value flows. This current generates a voltage across the resistor 9. The voltage generated is changed into a digital value by the A/D converter 6. The digital signal thus obtained is delivered to the comparator 4.

On the other hand, the reference current value search section 3 delivers a reference current value corresponding to the fundamental value delivered from the fundamental value determination section 1 to the comparator 4. The comparator 4 produces a signal indicative of a difference between the reference current value and a load current actually flowing in the solenoidal load 5 to deliver the difference signal to the correction value generator 10. The correction value generator 10 produces a duty factor adjustment signal for adjusting a value of the duty factor in accordance with the difference signal to deliver it to the duty factor adjustment section 7. The duty factor adjustment section 7 adjusts the value of the duty factor delivered from the duty factor search section 2 on the basis of the duty factor adjustment signal delivered so that the load current is equal to the reference current value searched in the reference current value search section 3 to output a signal indicative of the adjusted duty factor to the driver 8. As a result, since the driver 8 turns on and off a current delivered to the solenoidal load 5 in accordance with the adjusted duty factor, a current flowing in the load 5 is controlled so that its value is equal to the reference current value searched in the reference current value search section 3.

When there occurs a short in the solenoidal load 5, an overcurrent flows, thus generating a large voltage across the resistor 9. Accordingly, the difference between a value of the signal delivered to the input terminal 4B of the comparator 4 and that delivered to the input terminal 4A is above the upper limit of the window set in the abnormal condition detector 11. As a result, a signal indicative of abnormal condition is output. Further, when there occurs a break in the solenoidal load 5, no current flows, with the result that the voltage across the resistor 9 becomes zero. For the same reason as stated above, the output of the comparator 4 becomes small. Accordingly, the output of the comparator 4 is below the lower limit value of the window set in the abnormal condition detector 11. As a result, a signal indicative of abnormal condition is output.

As described in detail, the load current control device according to the present invention is configured to provide a feedback of a load current, and to share a part of the function of the abnormal condition detector with the section for controlling the load current, thus reducing the number of parts used to provide improved reliability and economical advantage.

What is claimed is:

1. A load current control device comprising:

drive means responsive to a drive control signal indicative of a duty factor to be imposed on a solenoidal load for connecting a power source to said load or disconnecting said power source therefrom according to the imposed duty factor;

detector means for detecting the magnitude of the current flowing in said solenoidal load;

means responsive to an input signal indicative of an instruction related to the current flowing in said solenoidal load for determining a fundamental value based on the instruction;

duty factor search means for outputting a signal indicative of the duty factor corresponding to the fundamental value;

means for outputting a signal indicative of a reference current value corresponding to the fundamental value;

comparator means for comparing an actual load current value outputted from said detector means with the reference current value to output a signal indicative of a difference therebetween;

means for correcting the duty factor outputted from said duty factor search means by the difference signal outputted from said comparator means to supply the drive control signal indicative of the corrected duty factor to said drive means; and means responsive to an output signal of said comparator means for producing a signal indicative of an abnormal condition when the difference is out of a predetermined range.

2. A load current control device as set forth in claim 1, wherein said duty factor search means is provided with a memory for memorizing a predetermined corresponding relationship between said fundamental value and a duty factor.

3. A load current control device as set forth in claim 1, wherein said reference current value output means is provided with a memory for memorizing a predetermined corresponding relationship between said fundamental value and said reference current value.

4. A load current control device as set forth in claim 1, wherein said detector means includes a resistor connected in series with said solenoidal load, and an analog-to-digital converter for applying analog-to-digital conversion to voltage across said resistor.

5. A load current control device as set forth in claim 4, wherein said abnormal condition signal generator means includes a window comparator having upper and lower limits determined on the basis of a safety limit value of a current of said driver means and a minimum operable current of said solenoid, respectively.

* * * * *